Figure 1:
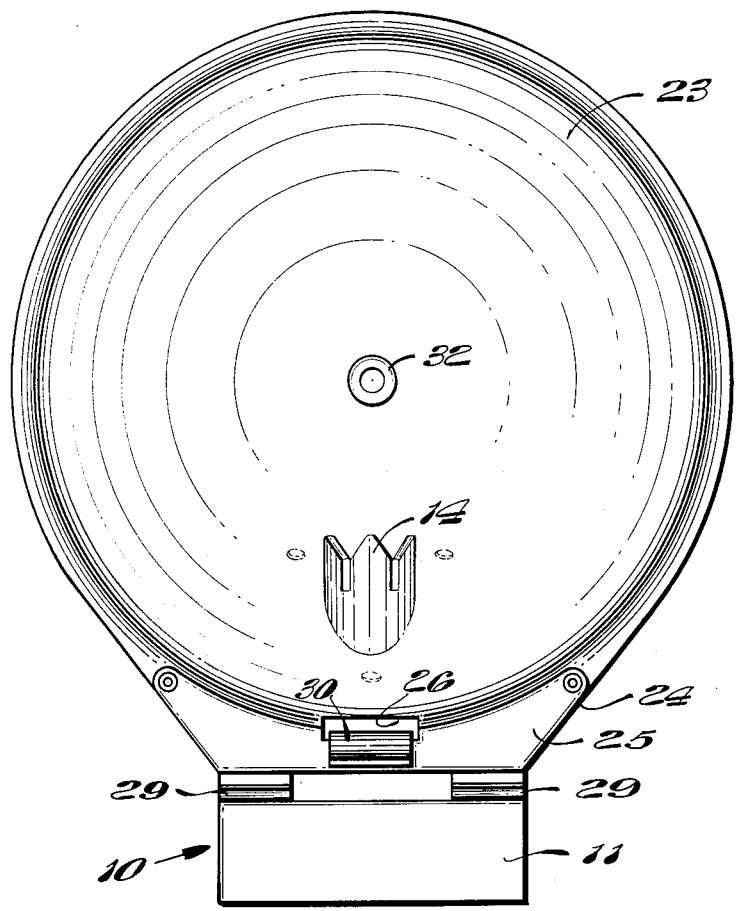

May 22, 1956 V. K. ELORANTA 2,747,076
PHOTOFLASH UNIT AND ACCESSORIES THEREFOR
Filed Oct. 10, 1952 2 Sheets-Sheet 2

INVENTOR.
Vaito K. Eloranta
BY Brown and Mikulka
and
Moncure B. Berg
Attorneys

United States Patent Office 2,747,076
Patented May 22, 1956

2,747,076

PHOTOFLASH UNIT AND ACCESSORIES THEREFOR

Vaito K. Eloranta, Boston, Mass., assignor to Polaroid Corporation, Cambridge, Mass., a corporation of Delaware Application October 10, 1952, Serial No. 314,181

8 Claims. (Cl. 240—1.3)

This invention relates to photoflash units or guns and more particularly has reference to a photoflash unit provided with a light-transmitting, protective shield and especially a shield equipped with means for removably securing one or more optical elements thereon.

Objects of this invention reside in the provision of a photoflash unit having a casing adapted to house electrical means for firing a flash bulb, a bulb-receiving socket and a concave reflector carried by the casing, and a protective, light-transmitting shield mounted upon the casing for displaceably closing the mouth of the reflector of the unit and providing means for controlling the ejection of glass particles from the reflector in the event of the accidental explosion of the flash bulb therein, and especially in the provision of means for mounting the light-transmitting, protective shield on the casing for pivotal movement about an axis which is substantially at right angles to the optical axis of the reflector so that the protective shield is movable away from the reflector from a position wherein it closes the mouth thereof to a position wherein the interior of the reflector is readily accessible for inserting and removing a flash bulb, as well as to provide means of this character which pivotally support one edge of the protective shield and which are provided with spring means adapted to act in accordance with the position of the shield in its path of movement to urge the shield to closure position and to hold the shield in open position.

Other objects of the invention are to provide a light-transmitting, protective shield of the character described, together with one or more optical elements which are capable of modifying light transmitted therethrough and which are removably mountable on said shield, for use in combination with a photoflash unit, and particularly to provide fastening means on said protective shield adapted to cooperate with fastening means on each optical element whereby the shield and one or more optical elements may be disengageably connected together.

Further objects of the invention are to provide a protective shield for closing the mouth of a reflector of a photoflash unit wherein the shield is formed of a light-transmitting material and has an enlarged body portion capable of closing the mouth of the reflector of the photoflash unit and has an extension of said body portion which is adapted to be secured to the photoflash unit, together with fastening means carried by the body portion of the shield for removably securing to the shield an optical element for modifying light transmitted through the shield; and to provide a light-transmitting, protective shield of the character described and one or more optical elements capable of modifying light transmitted through the shield, together with fastening means on the shield and on each said optical element, whereby the optical elements, either individually or collectively, and said shield may be disengageably connected together.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

Figures 2, 3:
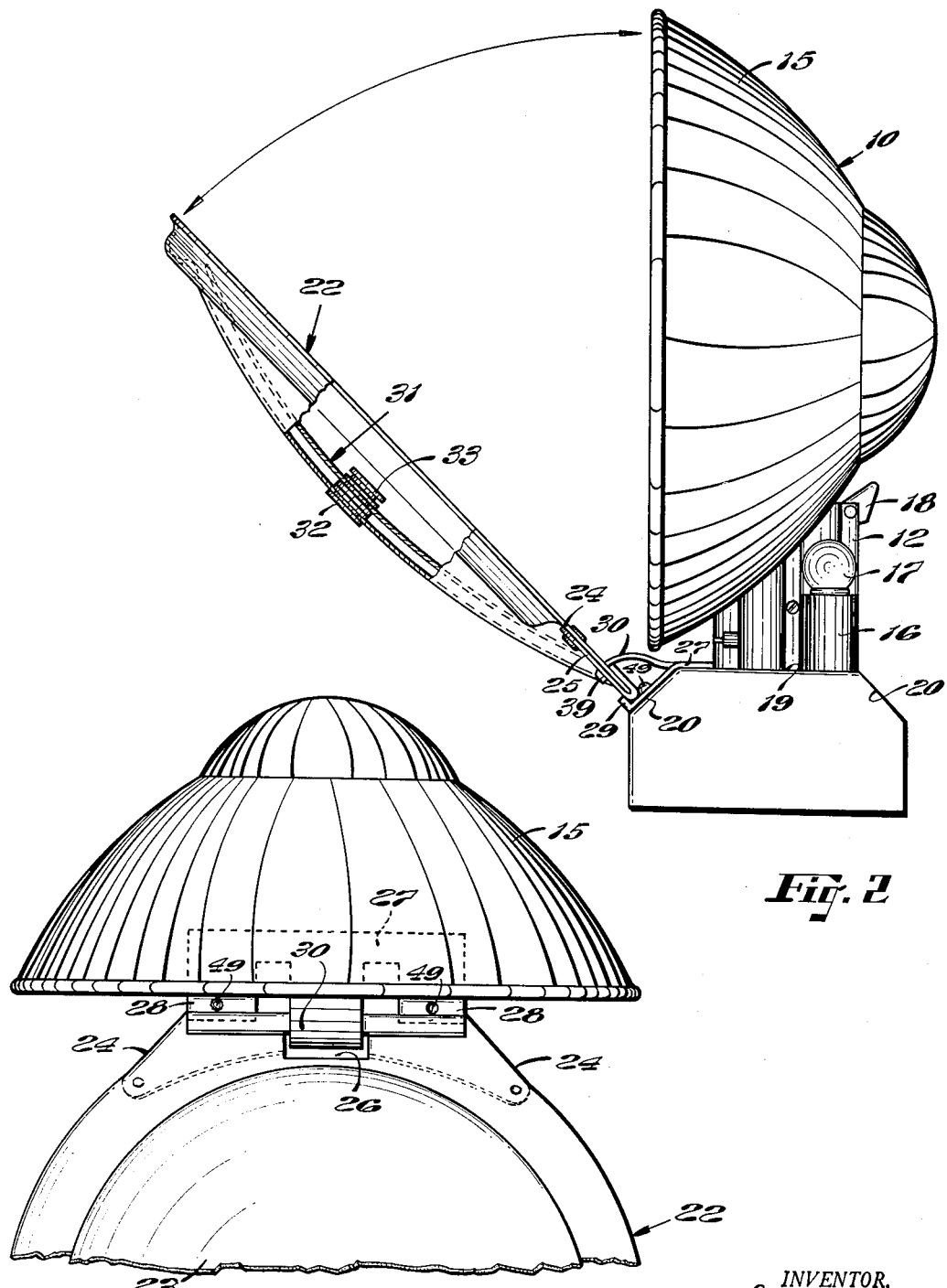

For a fuller understanding of the nature and objects of the invention, reference should be had to the following detailed description taken in connection with the accompanying drawings wherein:

Figure 1 is a front view of a photoflash unit having a light-transmitting, protective shield mounted thereon, the shield being shown in position for closing the mouth of the reflector of the photoflash unit;

Fig. 2 is a side elevation of the photoflash unit of Fig. 1 wherein the protective shield thereof is shown in open position and swung away from the reflector to permit access for inserting or removing a flash bulb and wherein the shield is shown with parts broken away and parts in section and has an optical element removably secured thereto; and Fig. 3 is a plan view of Fig. 2 with parts of the protective shield broken away and with the optical element omitted.

Throughout the drawings, wherein like reference numerals refer to similar parts, there is shown a photoflash unit or gun designated generally by the reference numeral 10 and comprising a sheet metal or other casing 11 which is adapted to house electrical means for firing the gun, a metal shell 12 mounted to extend from a surface of the casing and providing means for supporting a bulb socket 14 and a metallic or other concave reflector 15 in surrounding relation thereto. The shell 12 is provided with an enlargement 16 adapted to support a test bulb 17 which is utilized in a manner well-understood to the art for the purpose of indicating if a battery and/or flash circuit employed with the unit are in operating order. Additionally, shell 12 is shown as having a lever member 18 which provides the actuating means for conventional flash-bulb-ejecting mechanism employed for the purpose of assisting in removing a flash bulb from the socket 14.

The casing 11 is, in general, a boxlike structure having a top portion 19 which is flat. As shown in Fig. 2, the flat top 19 is joined at its side edges to depending portions 20 which are inclined downwardly toward the bottom of the casing and which are joined to the sides of the casing. However, it will be appreciated that the casing may be constructed so as to have a true rectangular shape. As previously pointed out, the casing 11 is adapted to provide a housing for electrical means for operating the flash unit. Consequently, the bottom of the casing is in the form of a closure which is removably connected to the casing by any conventional practices. While not shown, the removable casing bottom may be provided with conventional means for detachably securing the flash unit 10 to a camera.

A flash unit possessing the structural arrangements and features so far set forth is of conventional nature and follows in general of the design of the flash unit disclosed in U. S. Patent No. 2,496,680, issued on February 7, 1950, to Morris Schwartz.

The means for firing the flash bulb are located within the casing 11 and may comprise one or more dry cell batteries housed in casing 11, and suitable wiring for providing a conventional circuit which includes the batteries, flash bulb, test bulb and a suitable switch mechanism actuated by the shutter of the camera with which the flash unit is employed. One such circuit is shown in the previously mentioned U. S. Patent No. 2,496,680. The circuit of said patent may be modified to include a condenser, which is also adapted to be housed in the casing 11, whereby to provide a capacitor type of flash circuit following the general design disclosed in Patent No. 2,584,858 issued to William H. Fritz on February 5, 1952.

One feature of the present invention resides in providing means for avoiding danger to the subject being photographed from the possible explosion of a flash bulb. When an explosion of a flash bulb takes place, particles of the glass envelope of the bulb have been known to be projected from the reflector of the photoflash unit as far as ten feet or more. While flash bulb explosions are generally infrequent, it will be appreciated that the bulbs themselves are potentially capable of causing severe physical injury to a person or persons being photographed or physical harm to some other subject, such as a valuable painting, which is being photographed.

Danger arising from the explosion of a flash bulb may be avoided by hingedly mounting a light-transmitting, protective shield 22, such as that shown in the drawings, on the flash unit 10 so that the shield may close the opening in the reflector during the firing of a flash bulb and may be moved away or displaced from its closure position to permit access to the interior of the reflector to insert or remove a flash bulb.

The shield 22 is comprised of an enlarged body portion 23 having an extension 24 thereon which tapers outwardly from the body portion so that its minimum width dimension is at its extremity farthest removed from the body 23 and is there shaped to have a substantially straight edge. A metallic mounting member 25 is secured to the extension 24 as by means of rivets or other fastenings. Mounting member 25 is bent over upon itself at one end so as to have two overlying arms of unequal length between which the extension 24 is engaged. Additionally, the extension 24 and the mounting member 25 are each provided with an opening therethrough, and the mounting member and shield extension are secured together with these openings in registration. The purpose of these registered openings, which for the sake of convenience are both designated by the reference character 26, will presently appear.

The body portion 23 of the shield is of an area sufficient to close the open end of the reflector. As shown, body portion 23 is generally circular and of a radius slightly greater than the radius of the open end of the reflector 15 so that the shield may be held against or seated on the periphery of the open end of the reflector whereby to close the opening therein. Alternatively, although not preferably, the size of the shield may be made such that it will engage within the interior of the reflector.

The protective shield 22 is preferably made of any suitable light-transmitting, organic plastic material such, for example, as cellulose acetate, cellulose acetate butyrate or similar materials which are relatively noninflammable. Suitable glasses may also be employed as structural materials for the shield. In a preferred embodiment, the body portion 23 of the shield is, as shown, provided with a circular rim or flange within which is a generally spherical portion providing the major part of the shield body 23 while the extension 24 of the body is generally flat. Design of the shield structure just described is particularly suited for formation thereof from plastic materials by conventional molding practices. Mounting member 25 is shaped and proportioned so as to have its longer arm substantially flush with the rim or flange on the shield at a location adjacent the merger of shield extension 24 with the body portion 23 of the shield.

In the illustrated embodiment, shield 22 is mounted upon the flash unit 10 so that the convex face of the open spherical part thereof is farthest removed from the open end of the concave reflector 15. Preferably, the opposed faces of the spherical part of the shield 22 are concentric so that the shield is substantially without lens power. However, the concept of designing the shield to produce a lens effect therein falls within the scope of the invention. Also included within the scope of the invention is the utilization of a light-transmitting shield in which the body portion and the extension are both substantially flat so that the shield may be stamped or cut from sheet stock.

Means are provided for mounting the screen 22 on the flash unit 10 so that it is pivotable about an axis at right angles to the optical axis of the reflector 15 and in a direction toward and away from the reflector. These means include a hinge bracket 27 having a generally flat and elongated base portion adapted to be fixed to the flat surface 19 of casing 11, by suitable fastening means such as screws or the like, at a location adjacent that edge of the flat surface 19 which underlies the reflector 15. The hinge bracket 27, as best shown in Figs. 2 and 3, makes use of a pair of similar support members 28 in the form of arms which individually extend from opposite ends of the base of the hinge bracket 27 in a direction transversely of the base, while the base extends across the casing 11 with its length direction at right angles to the optical axis of the reflector. Each support member 28 is angularly inclined to the base of the hinge bracket in a direction and by an amount so that the members 28 are seatable on the sloped edge 20 of the casing 11.

The support members 28 of the hinge bracket 27 each provide an individual seat upon which the outermost portion of the mounting member 25 on the shield extension 24 is pivotally supported so that the shield may be rocked toward and away from the reflector on what in effect may be considered as one edge of the shield. Stop means in the form of turned-up portions 29 at the end of each support member 28 are provided for limiting the movement of the shield 22 away from the reflector and further assist in maintaining the shield in hingedly mounted condition upon the hinge bracket.

Additionally, the hinge bracket 27 is provided with an elongated spring member 30. The hinge bracket itself is in plan somewhat in the shape of the letter U, but has an elongated base. Spring member 30 extends transversely of this base at a location between the end support members 28 and from the same side of the base so that it may extend through the openings 26 in the shield-mounting member 25 and the shield extension 24. The free end of spring member 30 is provided with an overturned portion or stop means 39 which is also used for limiting the movement of the shield away from the reflector and for retaining the shield in pivotally mounted condition.

As may be observed, spring 30 is elevated with respect to the support members 28 of the hinge bracket 27 and is designed so that it is substantially constantly urged toward these members and so that, when it operatively extends through the openings 26 in mounting member 25 and shield extension 24, it will be pressed in contact against the edges of the openings 26 which are located the farthest away from the body portion 23 of the shield whereby the spring will be tensioned or loaded. It will be appreciated from this construction that the spring 30 will urge the shield into the open position shown in Fig. 2 and will also urge the shield into its closed position shown in Fig. 1 in accordance with the location of the shield in its path of pivotal movement, there being an intermediate position in this path which is a dead center position wherein the action of the spring is substantially entirely toward the support members 28 and substantially to the exclusion of a force component acting toward or away from the reflector. The spring 30 acts to snap the shield 22 against the reflector when the shield is on the side of the dead center position nearest the reflector and to urge the shield to its open position when it is on the opposite side of the dead center position.

Preferably, each support member 28 of the hinge bracket is provided on the support surface thereof with a struck-up portion or dimple 49 spaced from the stop 29 by approximately the thickness between the outer surfaces of the arms of the shield-mounting member 25. Such practice is desirable to restrain shield 22 from outward movement from its fully open position of Fig. 2 by resisting any tendency of the shield to pivot about the stop member 39 on spring 30 by accidental or other application of a counterclockwise-directed force to the shield. As shown, the shield-mounting member 25 is retained between each stop 29 and each dimple 49 when the shield is open as in Fig. 2. Instead of struck-up, dimple-forming portions 49, an individual member may be suitably secured to each support member 28 to function as stop means in the manner of the dimples.

It is not essential for spring 30 to be constructed so as to develop a spring loading capable of holding shield 22 in its closed position illustrated in Fig. 1 upon the explosion of a flash bulb. Movement of the shield outwardly and even to the fully open position of Fig. 2 as a result of an explosion is safe in nature since the surface of the shield will deflect glass particles of an exploded bulb generally upwardly or in a direction or directions away from the subject being photographed.

A flash bulb changing or removal operation is simply accomplished by manually applying pressure at an edge of the shield 22 to move it outwardly from its closed to its open position. Upon completion of the bulb changing or removal operation, the shield may be tapped with the hand to urge it to a position past dead center whereupon the spring action will snap it into the closed position of Fig. 1.

Other modifications of the shield-mounting means fall within the scope of the invention. For example, while the hinge bracket 27 has been shown as having mounting members which are inclined to the base of the hinge bracket, it is possible to arrange these members to lie in the plane of the base of the hinge bracket. Similarly, the mounting means for the shield 22 which have been disclosed are not limited to a combination with a flash unit of the design illustrated in the drawings. Thus it falls within the scope of this invention to employ a hinge bracket having a flange depending from the base thereof for securing the hinge bracket to some part of the photoflash unit. Such a flange may have a flat surface or a curved surface whereby to permit the bracket to be secured to a part of a flash gun which is either flat or curved.

Because of the nature and characteristics of the light emitted by a flash bulb, it is not always possible in flash photography to illuminate the subject being photographed under optimum conditions. However, under such circumstances, it is possible to attain improvements in lighting effects by suitable modification of the light transmitted by the flash bulb. To this end and as heretofore intimated, an important concept of the invention resides in the provision of optical means adapted to be removably associated with the protective shield 22 for the purpose of providing a variety of modifying effects on the light transmitted by the flash bulb of the photoflash unit.

By way of illustrating some improved effects, it may be noted that a soft background is considered attainable in portraiture if the light from the photoflash bulb is transmitted through a diffusing screen before it reaches the subject. Similarly, contrast and sharpness may be enhanced in flash photographs taken in a smoke-filled room by the employment on the flash unit of a yellow or haze-reducing filter. As another example, lighting conditions in flash photography may be improved by polarizing the light emitted by the flash bulb with a sheet polarizer or by controlling this light by the use of crossed polarizers.

The protective shield 22 is specially suited in design for attaining lighting improvements of the nature described, and for this purpose the invention makes use of optical elements of the character just mentioned in conjunction with mounting means carried by the shield and the individual optical elements whereby the optical elements, either individually or collectively, and the shield may be removably connected together.

An optical element of the character described is illustrated in Fig. 2 in conjunction with shield 22 and is generally indicated by the reference numeral 31. The optical element 31 may be a diffusing screen or filter, a yellow filter, or a light-polarizing filter. The illustration in Fig. 2 shows the optical element 31 mounted upon the spherical portion of the shield body 23 by disengageable connecting or fastening means. For the purpose of making this removable mounting or connection, the body portion 23 of the shield and the optical element 31 are provided at their respective centers with cooperating snap fastener means indicated respectively by the reference characters 32 and 33. The snap fastener means 32, 33 are preferably of the stacking button type whereby one or more additional optical elements may be removably secured to the element 31 in facing relation to the side thereof which is farthest removed from the spherical portion of the shield 22.

The various optical elements which are adapted to be associated with the shield 22 are preferably formed of suitable organic plastic material. For example, a diffusing screen or filter may comprise a suitably shaped sheet of cellulose acetate or cellulose acetate butyrate which has one or both sides thereof suitably roughened to provide a diffusing surface. A yellow filter may be provided from the same material in which a suitable yellow dye or stain has been incorporated. A light-polarizing filter may, for example, comprise any of the sheet type of polarizers disclosed in U. S. Patent No. 2,237,567 issued to Edwin H. Land and U. S. Patent No. 2,173,304 issued to Edwin H. Land and Howard G. Rogers. The sheet polarizing materials disclosed in these patents may be employed in a laminated sandwich type of structure in which the outer layers are provided by cellulose acetate or similar material in sheet form.

Each optical element 31 has a diameter similar to that of the spherical part of the body portion 23 of the shield and by conventional practices is also spherically shaped so as to have a radius of curvature similar to or concentric with the radius of curvature of the spherical part of the shield. Like the shield, each optical element 31 is preferably substantially without lens power. It will be appreciated that, under these conditions, an optical element 31 when mounted on the shield will lie in relatively close proximity to the surface of the spherical part of the shield. Similar conditions will, of course, exist for additional optical elements snapped onto a part of the fastener means 33.

While, as previously pointed out, it is preferable to employ a shield having a spherical part in the body portion thereof, in instances where the shield has substantially flat surfaces throughout its entirety, the various optical elements 31 will also be constructed so as to have substantially flat surfaces. Thus, it will be appreciated that the concept of utilizing an optical element in combination with a protective shield is not limited to the specific shield and optical element construction which forms the subject of illustration herein.

With special regard to light-polarizing filter means adapted to be employed with the shield 22, it is to be noted that such means may be utilized in several forms. For example, a single light-polarizing filter 31 comprising an individual sheet polarizer may be employed by itself or two such filters may be combined for use together by placing them in superposed relation. This latter practice makes it possible to variably control the light transmitted by a flash bulb by adjustably arranging the sheet polarizers in such relation to each other that their polarizing axes are partially crossed.

It is, of course, within the concept of the invention to use any combination of optical elements 31. For example, a diffusing screen may be used by itself or in conjunction with one or more polarizers, or one or more polarizers and a yellow filter may be used together, as well as other combinations of the optical elements described. Furthermore, while a yellow filter has been specifically set forth, it is to be understood that the invention is not limited to a filter of that color and includes filters of other colors. Additionally, it is sometimes desirable to dye the diffusing filter, and such a practice falls within the scope of the invention. For example, it is frequent practice to utilize a diffusing filter which is tinted with a pastel color such as an opal-colored diffusing filter.

Since flash bulbs generate light of infrared wave lengths, it is also within the concept of the invention to use a filter element of a character which absorbs visible light but transmits infrared. Furthermore, for the control of the infrared transmission, it is possible to use one or more infrared polarizers such, for example, as the light polarizers disclosed in the U. S. Patent No. 2,494,686 issued to Robert P. Blake.

As previously pointed out, the fastening means 32 and 33 are located at the respective centers of the body portion 23 of the shield 22 and the optical element 31. The shield is also designed so that when in closed position the fastening means 32 and 33 will be substantially aligned on the optical axis of the reflector 15. Preferably, each optical element 31 is mounted on the concave side of the spherical portion of the shield to the end of protecting it from accidental dislodgement and rough handling.

To install an optical element 31, the shield is swung to its open position of Fig. 2, an element 31 is placed within the concave side of the shield and the fastening means 32 and 33 are snapped together, whereby the optical element is ready to carry out its intended function upon moving the shield to its closure position. Operation of the mounted optical element 31 will be apparent. When the flash bulb is fired, light emitted therefrom is transmitted through the optical element and the shield toward the subject being photographed. Movement of the shield to an open position to remove or replace a flash bulb will not, of course, disturb the mounting or connection of the optical element to the shield. Removal of the optical element also takes place from the open position of the shield and by merely exerting a slight pull upon the fastening means illustrated. If additional optical elements are intended to be used, they are placed on top of the illustrated element 31 and are snapped into fastening relation thereto. Their operation and removal are similar in manner to that already described.

For general use and all-purpose requirements, shield 22 is formed of a substantially clear and transparent material and modification of light transmitted therethrough is effected by securing one or more of the optical elements 31 thereto. It is possible, however, to utilize the shield for light modification purposes by constructing it so that it is capable of performing one of the light screening or filtering actions ascribed to the optical elements 31. In instances where the screen itself is utilized to modify light transmitted therethrough, further light modification is attainable by the association therewith of one or more of the various optical elements 31. As will be understood, practice of this nature falls within the scope of the invention.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A flash gun for use with a camera and comprising a casing adapted to house electrical means for firing a flash bulb, a bulb-receiving socket extending from said casing, a concave reflector carried by said casing in surrounding relation to said bulb-receiving socket, a light-transmitting protective shield for closing the mouth of said reflector, said shield being of a size sufficient to engageably contact the periphery of said mouth, a hinge bracket mounted on said casing adjacent the mouth of said reflector, one edge of said shield being seated on said hinge bracket and said hinge bracket providing means for supporting said shield for pivotal movement on said edge toward and away from the mouth of said reflector, and an elongated spring member extending from said hinge bracket, said shield adjacent the edge thereof supported upon said bracket being provided with an opening therethrough and said spring member being engaged within said opening in bearing contact with an edge thereof and extending through said opening.

2. A flash gun as defined in claim 1 wherein said hinge bracket has an elongated base and an individual support member extending from the same side of said base in a direction transversely thereof and at each end of said base, each support member providing a seat for said edge of said shield.

3. A flash gun as defined in claim 2 wherein the end of each said support member which is located the farthest from the base of said hinge bracket is angularly inclined to said support member to provide stop means for limiting the pivotal movement of said shield away from said reflector.

4. A flash gun as defined in claim 1 wherein said hinge bracket has an elongated base and wherein said spring member extends from said base in a direction transversely of the base at a location intermediate of the ends of the base, and similar support members extend individually from each end of said base in a direction transversely of the base and on each side of said spring member, each support member providing a seat for said edge of said shield.

5. A flash gun as defined in claim 4 wherein the end of each said support member which is located the farthest from the base of said hinge bracket is angularly inclined to said support member to provide stop means for limiting the pivotal movement of said shield away from said reflector.

6. A flash gun as defined in claim 1 wherein said hinge bracket is generally U-shaped and provided with an elongated base and has the arms of said U providing similar support members upon which said edge of said shield is pivotally seated, said spring member being located intermediately of the base of the U-shaped hinge bracket and extending away from said base between said arms, said spring member having at least a portion thereof which is elevated with respect to said base.

7. A flash gun for use in a camera, said flash gun comprising a casing adapted to house electrical means for firing a flash bulb, said casing having a generally flat surface, a bulb-receiving socket extending in a direction normal to said flat surface, a concave reflector supported upon and extending from said flat surface in surrounding relation to said bulb-receiving socket, said reflector being positioned to have its optical axis at least generally parallel to said flat surface, a light-transmitting protective shield of a size sufficient to engageably contact the periphery of the mouth of said reflector for closing said mouth, a hinge bracket mounted on said casing adjacent the mouth of said reflector and in part underlying said reflector, said hinge bracket having a generally flat and elongated base fixed to said flat surface at a location adjacent one edge of said flat surface, similar support members extending individually from opposite ends of the base of said hinge bracket in a direction transversely of said base, each said support member being angularly inclined to said base of said hinge bracket and in depending relation thereto and to said flat surface and each said support member providing a seat upon which one edge of said shield is pivotally supported, an elongated, flat spring member extending from said hinge bracket in a direction transversely thereof and said spring member being located intermediately of and between the support members of said hinge bracket, said spring member having at least a portion thereof elevated with respect to said support members, said shield adjacent the edge thereof supported on said bracket being provided with an opening therethrough, said spring member extending through said opening in bearing contact with an edge of said opening, and stop means for limiting the movement of said shield away from the mouth of said reflector provided on each of said support members.

8. In a photoflash unit including a casing adapted to house electrical means for firing a flash bulb, a bulb-receiving socket on said casing, and a concave reflector carried by said casing in surrounding relation to said bulb-receiving socket, in combination, a light-transmitting protective shield of a size sufficient to engageably contact the periphery of the mouth of said reflector for closing said mouth, mounting means for mounting said shield on said casing for displaceably holding said shield against the mouth of said reflector and for pivotal movement about an axis from said position where it contacts said reflector and closes the mouth thereof to a position where it is swung away from said reflector to open said mouth for access to the interior of the reflector for the insertion and and removal of a flash bulb, said axis about which said shield pivots being located in a plane at right angles to the optical axis of said reflector and being in said plane at a location adjacent said casing, and a spring member associated with said mounting means and extending from said mounting means in a direction generally parallel to the direction of said optical axis, said shield being provided with an opening therein and said spring member extending into said opening and engaging said shield adjacent an edge portion of said opening and providing the only means for holding said shield in contact with said reflector, said spring member being under sufficient loading to normally maintain said shield in contact with said reflector when the shield is in closure position but under insufficient loading to fully resist gas pressure generated within the reflector by the explosion of a flash bulb therein whereby said shield is free for limited movement about its axis in response to said generated pressure to relieve said generated pressure and predeterminedly direct particles of glass discharged upon explosion of said bulb, an optical element capable of modifying light transmitted by said photoflash unit, a first fastening means carried by said shield and a second fastening means carried by said optical element and cooperating with said first fastening means whereby said optical element is readily attachable to and detachable from said shield, both said fastening means being located substantially centrally of said shield and of said optical element.

References Cited in the file of this patent
UNITED STATES PATENTS

| | | |
|---|---|---|
| 1,321,521 | Green | Nov. 11, 1919 |
| 1,626,301 | Rhodes | Apr. 26, 1927 |
| 1,697,074 | Lorentzen | Jan. 1, 1929 |
| 2,078,096 | Parkin | Apr. 20, 1937 |
| 2,300,504 | Hedges | Nov. 3, 1942 |
| 2,485,403 | Noel et al. | Oct. 18, 1949 |
| 2,496,680 | Schwartz | Feb. 7, 1950 |
| 2,528,038 | Crise | Oct. 31, 1950 |
| 2,614,783 | Spear | Oct. 21, 1952 |

FOREIGN PATENTS

| | | |
|---|---|---|
| 265,393 | Great Britain | Feb. 10, 1927 |
| 684,424 | France | Mar. 17, 1930 |
| 666,722 | Germany | Oct. 26, 1938 |